US008065661B2

(12) United States Patent
Sattler et al.

(10) Patent No.: US 8,065,661 B2
(45) Date of Patent: Nov. 22, 2011

(54) TEST ENGINE

(75) Inventors: Juergen Sattler, Wiesloch (DE);
Joachim Gaffga, Wiesloch (DE);
Robert Viehmann, Waghausl (DE);
Frank Markert, Grossostheim (DE);
Steffen Riemann, St. Leon-Rot (DE)

(73) Assignee: SAP AG, Walldorf (DE)

( * ) Notice: Subject to any disclaimer, the term of this patent is extended or adjusted under 35 U.S.C. 154(b) by 1204 days.

(21) Appl. No.: 11/512,441

(22) Filed: Aug. 29, 2006

(65) Prior Publication Data

US 2008/0126448 A1   May 29, 2008

(51) Int. Cl.
*G06F 9/44* (2006.01)
(52) U.S. Cl. ........ 717/124; 717/121; 717/126; 717/127; 714/38.1
(58) Field of Classification Search .................. 717/124, 717/126; 714/38
See application file for complete search history.

(56) References Cited

U.S. PATENT DOCUMENTS

| | | | |
|---|---|---|---|
| 4,079,452 A | 3/1978 | Larson et al. | |
| 4,501,528 A | 2/1985 | Knapp | |
| 5,307,499 A * | 4/1994 | Yin ............................... | 717/139 |
| 5,459,868 A * | 10/1995 | Fong ............................ | 717/139 |
| 5,647,056 A * | 7/1997 | Barrett et al. ................ | 709/220 |
| 5,657,448 A * | 8/1997 | Wadsworth et al. .......... | 709/220 |
| 5,680,624 A * | 10/1997 | Ross ............................. | 710/261 |
| 5,754,845 A * | 5/1998 | White .......................... | 717/147 |
| 5,758,062 A | 5/1998 | McMahon et al. | |
| 5,857,102 A * | 1/1999 | McChesney et al. ......... | 713/100 |
| 5,978,579 A | 11/1999 | Buxton et al. | |
| 6,044,461 A | 3/2000 | Agha et al. | |
| 6,067,525 A | 5/2000 | Johnson et al. | |
| 6,128,730 A * | 10/2000 | Levine ............................. | 713/1 |
| 6,161,123 A | 12/2000 | Renouard et al. | |
| 6,161,176 A | 12/2000 | Hunter et al. | |
| 6,185,587 B1 | 2/2001 | Bernardo et al. | |
| 6,189,139 B1 * | 2/2001 | Ladd ............................. | 717/135 |
| 6,230,305 B1 | 5/2001 | Meares | |
| 6,301,710 B1 | 10/2001 | Fujiwara | |
| 6,324,578 B1 * | 11/2001 | Cox et al. ...................... | 709/223 |
| 6,397,232 B1 | 5/2002 | Cheng-Hung et al. | |
| 6,449,624 B1 | 9/2002 | Hammack et al. | |

(Continued)

FOREIGN PATENT DOCUMENTS

JP             200487972 A     10/2004

(Continued)

OTHER PUBLICATIONS

Title: System for automated validation of embedded software in multiple operating configurations, source: IEEE, author::Lingamarla, S.et al, dated:Oct. 12, 1999.*

(Continued)

*Primary Examiner* — Chameli Das
(74) *Attorney, Agent, or Firm* — Schwegman, Lundberg & Woessner, P.A.

(57) ABSTRACT

The present subject mater relates to testing software application configurations and, more particularly, to a test engine. The various embodiments described and illustrated herein provide systems, methods, and software that maintain a configuration database in a memory, wherein the configuration database includes a representation of configuration settings of an application. Some such embodiments may further store a test engine module in the memory, wherein the test engine module includes a set of test cases, which when processed, test functionality of the application, wherein a test case is selected for execution as a function of one or more application configuration setting representations from the configuration database.

17 Claims, 5 Drawing Sheets

U.S. PATENT DOCUMENTS

| | | |
|---|---|---|
| 6,453,302 B1 | 9/2002 | Johnson et al. |
| 6,466,972 B1 | 10/2002 | Paul et al. |
| 6,470,464 B2 | 10/2002 | Bertram et al. |
| 6,513,045 B1 | 1/2003 | Casey et al. |
| 6,523,027 B1 | 2/2003 | Underwood |
| 6,538,668 B1 | 3/2003 | Ruberg et al. |
| 6,539,372 B1 | 3/2003 | Casey et al. |
| 6,728,877 B2 | 4/2004 | Mackin et al. |
| 6,763,327 B1 | 7/2004 | Songer et al. |
| 6,804,709 B2 * | 10/2004 | Manjure et al. ............... 709/220 |
| 6,810,401 B1 | 10/2004 | Thompson et al. |
| 6,868,392 B1 | 3/2005 | Ogasawara |
| 7,031,951 B2 | 4/2006 | Mancisidor et al. |
| 7,032,114 B1 | 4/2006 | Moran |
| 7,062,502 B1 | 6/2006 | Kesler |
| 7,089,317 B2 | 8/2006 | Jeyaraman et al. |
| 7,099,945 B2 | 8/2006 | Lugger et al. |
| 7,181,731 B2 | 2/2007 | Pace et al. |
| 7,206,827 B2 | 4/2007 | Viswanath et al. |
| 7,209,851 B2 * | 4/2007 | Singh et al. ................... 702/119 |
| 7,228,326 B2 | 6/2007 | Srinivasan et al. |
| 7,283,816 B2 | 10/2007 | Fok et al. |
| 7,299,382 B2 * | 11/2007 | Jorapur ............................ 714/38 |
| 7,305,659 B2 * | 12/2007 | Muller et al. .................. 717/127 |
| 7,337,317 B2 | 2/2008 | Meggitt et al. |
| 7,340,411 B2 | 3/2008 | Cook |
| 7,360,211 B2 | 4/2008 | Hyden et al. |
| 7,376,682 B2 | 5/2008 | Ramacher et al. |
| 7,379,455 B2 | 5/2008 | Pickett |
| 7,412,497 B2 | 8/2008 | Viswanath et al. |
| 7,421,621 B1 * | 9/2008 | Zambrana .................. 714/38.14 |
| 7,426,694 B2 | 9/2008 | Gross et al. |
| 7,487,231 B2 | 2/2009 | Brown et al. |
| 7,519,964 B1 | 4/2009 | Islam et al. |
| 7,526,457 B2 | 4/2009 | Duevel et al. |
| 7,540,014 B2 | 5/2009 | Vasishth et al. |
| 7,590,669 B2 | 9/2009 | Yip et al. |
| 7,593,124 B1 | 9/2009 | Sheng et al. |
| 7,599,895 B2 | 10/2009 | Nugent |
| 7,606,840 B2 | 10/2009 | Malik |
| 7,609,651 B1 | 10/2009 | McBride et al. |
| 7,610,582 B2 | 10/2009 | Becker et al. |
| 7,617,256 B2 | 11/2009 | Mohamed et al. |
| 7,640,542 B2 * | 12/2009 | Herenyi et al. ............... 717/177 |
| 7,644,432 B2 | 1/2010 | Patrick et al. |
| 7,657,887 B2 | 2/2010 | Kothandraman et al. |
| 7,665,082 B2 * | 2/2010 | Wyatt et al. .................. 717/171 |
| 7,685,577 B2 | 3/2010 | Pace et al. |
| 7,694,181 B2 * | 4/2010 | Noller et al. ............... 714/38.11 |
| 7,716,634 B2 | 5/2010 | Ross et al. |
| 7,725,877 B2 | 5/2010 | Andrade et al. |
| 7,739,657 B2 | 6/2010 | Rolfs |
| 7,823,124 B2 | 10/2010 | Sattler et al. |
| 7,827,528 B2 | 11/2010 | Sattler et al. |
| 7,831,568 B2 | 11/2010 | Sattler et al. |
| 7,831,637 B2 | 11/2010 | Sattler et al. |
| 7,908,589 B2 | 3/2011 | Sattler et al. |
| 2001/0044834 A1 | 11/2001 | Bradshaw et al. |
| 2001/0054091 A1 | 12/2001 | Lenz et al. |
| 2002/0026572 A1 | 2/2002 | Joory |
| 2002/0095663 A1 | 7/2002 | Joory |
| 2002/0099578 A1 | 7/2002 | Eicher et al. |
| 2002/0104097 A1 | 8/2002 | Jerding et al. |
| 2002/0116373 A1 | 8/2002 | Nishikawa et al. |
| 2002/0138570 A1 | 9/2002 | Hickey |
| 2002/0147784 A1 | 10/2002 | Gold et al. |
| 2002/0156947 A1 | 10/2002 | Nishio |
| 2002/0188625 A1 | 12/2002 | Jans et al. |
| 2003/0005411 A1 | 1/2003 | Gerken |
| 2003/0023963 A1 | 1/2003 | Birkholz et al. |
| 2003/0115292 A1 | 6/2003 | Griffin et al. |
| 2003/0120780 A1 | 6/2003 | Zhu et al. |
| 2003/0135842 A1 | 7/2003 | Frey et al. |
| 2003/0227392 A1 | 12/2003 | Ebert et al. |
| 2003/0237093 A1 | 12/2003 | Marsh et al. |
| 2004/0019669 A1 | 1/2004 | Viswanath et al. |
| 2004/0019670 A1 | 1/2004 | Viswanath et al. |
| 2004/0031030 A1 | 2/2004 | Kidder et al. |
| 2004/0060047 A1 | 3/2004 | Talati et al. |
| 2004/0088691 A1 | 5/2004 | Hammes et al. |
| 2004/0111417 A1 | 6/2004 | Goto et al. |
| 2004/0176996 A1 | 9/2004 | Powers et al. |
| 2004/0186927 A1 | 9/2004 | Eryurek et al. |
| 2004/0268342 A1 | 12/2004 | Hyden et al. |
| 2005/0007964 A1 | 1/2005 | Falco et al. |
| 2005/0044215 A1 | 2/2005 | Cohen et al. |
| 2005/0044546 A1 | 2/2005 | Niebling et al. |
| 2005/0080801 A1 | 4/2005 | Kothandaraman et al. |
| 2005/0086195 A1 | 4/2005 | Tan et al. |
| 2005/0108219 A1 | 5/2005 | De La Huerga |
| 2005/0108707 A1 | 5/2005 | Taylor et al. |
| 2005/0138558 A1 | 6/2005 | Duevel et al. |
| 2005/0144474 A1 | 6/2005 | Takala et al. |
| 2005/0160419 A1 | 7/2005 | Alam et al. |
| 2005/0188422 A1 | 8/2005 | Jooste |
| 2005/0193103 A1 | 9/2005 | Drabik |
| 2005/0262076 A1 | 11/2005 | Voskuil |
| 2005/0262499 A1 | 11/2005 | Read |
| 2005/0268282 A1 | 12/2005 | Laird |
| 2005/0278202 A1 | 12/2005 | Broomhall et al. |
| 2005/0278280 A1 | 12/2005 | Semerdzhiev et al. |
| 2006/0047793 A1 | 3/2006 | Agrawal et al. |
| 2006/0173857 A1 | 8/2006 | Jackson |
| 2006/0184917 A1 | 8/2006 | Troan et al. |
| 2006/0184926 A1 | 8/2006 | Or et al. |
| 2006/0224637 A1 | 10/2006 | Wald |
| 2006/0234698 A1 | 10/2006 | Fok et al. |
| 2006/0242697 A1 | 10/2006 | Takemura |
| 2006/0248450 A1 | 11/2006 | Wittenberg et al. |
| 2006/0253588 A1 | 11/2006 | Gao et al. |
| 2007/0006161 A1 | 1/2007 | Kuester et al. |
| 2007/0016591 A1 | 1/2007 | Beadles et al. |
| 2007/0022323 A1 * | 1/2007 | Loh et al. ......................... 714/38 |
| 2007/0025704 A1 | 2/2007 | Tsukazaki et al. |
| 2007/0074203 A1 | 3/2007 | Curtis et al. |
| 2007/0079289 A1 * | 4/2007 | MacCaux ..................... 717/124 |
| 2007/0079291 A1 * | 4/2007 | Roth ............................. 717/124 |
| 2007/0093926 A1 | 4/2007 | Braun et al. |
| 2007/0097975 A1 | 5/2007 | Rakers et al. |
| 2007/0157185 A1 | 7/2007 | Semerdzhiev |
| 2007/0157192 A1 | 7/2007 | Hoefler et al. |
| 2007/0168065 A1 | 7/2007 | Nixon et al. |
| 2007/0168971 A1 * | 7/2007 | Royzen et al. ................ 717/124 |
| 2007/0198437 A1 | 8/2007 | Eisner et al. |
| 2007/0234274 A1 | 10/2007 | Ross et al. |
| 2007/0234293 A1 * | 10/2007 | Noller et al. .................. 717/124 |
| 2007/0257715 A1 | 11/2007 | Semerdzhiev et al. |
| 2008/0059474 A1 | 3/2008 | Lim |
| 2008/0059490 A1 | 3/2008 | Sattler et al. |
| 2008/0059537 A1 | 3/2008 | Sattler et al. |
| 2008/0059630 A1 | 3/2008 | Sattler et al. |
| 2008/0071555 A1 | 3/2008 | Sattler et al. |
| 2008/0071718 A1 | 3/2008 | Sattler et al. |
| 2008/0071828 A1 | 3/2008 | Sattler et al. |
| 2008/0071839 A1 | 3/2008 | Sattler et al. |
| 2008/0082517 A1 | 4/2008 | Sattler et al. |
| 2008/0126375 A1 | 5/2008 | Sattler et al. |
| 2008/0127082 A1 | 5/2008 | Birimisa et al. |
| 2008/0127084 A1 | 5/2008 | Sattler et al. |
| 2008/0127085 A1 | 5/2008 | Sattler et al. |
| 2008/0127086 A1 | 5/2008 | Sattler et al. |
| 2008/0127123 A1 | 5/2008 | Sattler et al. |
| 2008/0195579 A1 | 8/2008 | Kennis et al. |
| 2009/0024990 A1 | 1/2009 | Singh et al. |
| 2009/0157455 A1 | 6/2009 | Kuo et al. |
| 2010/0082518 A1 | 4/2010 | Gaffga et al. |
| 2010/0153443 A1 | 6/2010 | Gaffga et al. |
| 2010/0153468 A1 | 6/2010 | Lange et al. |
| 2010/0192135 A1 * | 7/2010 | Krishnaswamy et al. .... 717/140 |
| 2011/0035629 A1 * | 2/2011 | Noller et al. ............... 714/38.14 |

FOREIGN PATENT DOCUMENTS

| | | |
|---|---|---|
| WO | WO-2004114130 A2 | 12/2004 |
| WO | WO-2005045670 A1 | 5/2005 |

OTHER PUBLICATIONS

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.

"International Application Serial No. PCT/EP2007/007461. International Search Report Nov. 26, 2007", 7 pgs.

"International Application Serial No. PCT/EP2007/007462, Partial International Search Report Dec. 27, 2007", 8 pgs.

"International Application Serial No. PCT/EP2007/007490, International Search Report Oct. 26, 2007", 4 pgs.

"International Application Serial No. PCT/EP2007/007491, International Search Report Oct. 22, 2007", 5 pgs.

"International Application Serial No. PCT/EP2007/007491, Written Opinion Oct. 22, 2007", 6 pgs.

"International Application Serial No. PCT/EP2007/007515, International Search Report Nov. 12, 2007", 8 pgs.

IndigoRose, "Setup Factory", *User's Guide IndigoRose Software Design No. 2*, (Mar. 1998),82 pgs.

"U.S. Appl. No. 11/512,517, Response to Non-Final Office Action mailed Jan. 29, 2009", 16 pgs.

"U.S. Appl. No. 11/512,609, Final Office Action mailed Dec. 8, 2008", 12 pgs.

"U.S. Appl. No. 11/512,884, Final Office Action mailed Dec. 19, 2008", 11 pgs.

"U.S. Appl. No. 11/512,886, Non-Final Office Action mailed Dec. 26, 2008", 10 pgs.

"U.S. Appl. No. 11/512,442, Non Final Office Action mailed Oct. 1, 2009", 15 pgs.

"U.S. Appl. No. 11/512,443, Examiner Interview Summary mailed Oct. 7, 2009", 4 pgs.

"U.S. Appl. No. 11/512,443, Final Office Action mailed Feb. 6, 2009", 20 pgs.

"U.S. Appl. No. 11/512,443, Non-Final Office Action mailed Jun. 26, 2009", 11 pgs.

"U.S. Appl. No. 11/512,443, Response filed Apr. 3, 2009 to Final Office Action mailed Feb. 6, 2009", 13 pgs.

"U.S. Appl. No. 11/512,443, Response filed Sep. 28, 2009 to Non Final Office Action mailed Jun. 26, 2009", 16 pgs.

"U.S. Appl. No. 11/512,516, Non-Final Office Action mailed Feb. 4, 2009", 12 pgs.

"U.S. Appl. No. 11/512,516, Non-Final Office Action mailed Jul. 10, 2009", 15 pgs.

"U.S. Appl. No. 11/512,516, Response filed Apr. 28, 2009 to Non Final Office Action mailed Feb. 4, 2009", 16 pgs.

"U.S. Appl. No. 11/512,516, Response filed Oct. 9, 2009 to Non Final Office Action mailed Jul. 10, 2009", 9 pgs.

"U.S. Appl. No. 11/512,517, Non-Final Office Action mailed Sep. 16, 2009", 16 pgs.

"U.S. Appl. No. 11/512,517, Notice of Allowance mailed Apr. 3, 2009", 10 pgs.

"U.S. Appl. No. 11/512,519, Final Office Action mailed Feb. 2, 2009", 14 pgs.

"U.S. Appl. No. 11/512,520, Non-Final Office Action mailed Jul. 22, 2009", 14 pgs.

"U.S. Appl. No. 11/512,520, Response filed Oct. 22, 2009 to Non Final Office Action mailed Jul. 22, 2009", 13 pgs.

"U.S. Appl. No. 11/512,609, Non Final Office Action mailed Apr. 27, 2009", 15 pgs.

"U.S. Appl. No. 11/512,609, Response filed Feb. 17, 2009 to Final Office Action mailed Dec. 8, 2008", 10 pgs.

"U.S. Appl. No. 11/512,609, Response filed Jul. 24, 2009 to Non Final Office Action mailed Apr. 27, 2009", 11 pgs.

"U.S. Appl. No. 11/512,886, Examiner Interview Summary mailed Sep. 29, 2009", 2 pgs.

"U.S. Appl. No. 11/512,886, Final Office Action mailed Jun. 24, 2009", 11 pgs.

"U.S. Appl. No. 11/512,886, Response filed Mar. 25, 2009 to Non Final Office Action mailed Dec. 26, 2008", 9 pgs.

"U.S. Appl. No. 11/512,886, Response filed Sep. 22, 2009 to Final Office Action mailed Jun. 24, 2009", 10 pgs.

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Written Opinion Mailed Mar. 17, 2008", 8 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.

"U.S. Appl. No. 11/512,442, Final Office Action mailed Apr. 21, 2010", 13 pgs.

"U.S. Appl. No. 11/512,442, Response filed Jan. 4, 2010 to Non Final Office Action mailed Oct. 1, 2009", 10 pgs.

"U.S. Appl. No. 11/512,443, Final Office Action mailed Jan. 22, 2010", 14 pgs.

"U.S. Appl. No. 11/512,443, Response filed Apr. 22, 2010 to Final Office Action mailed Jan. 22, 2010", 12 pgs.

"U.S. Appl. No. 11/512,457, Non-Final Office Action mailed May 13, 2010", 11 pgs.

"U.S. Appl. No. 11/512,516, Final Office Action mailed Mar. 5, 2010", 16 pgs.

"U.S. Appl. No. 11/512,516, Response filed Apr. 30, 2010 to Final Office Action mailed Mar. 5, 2010", 9 pgs.

"U.S. Appl. No. 11/512,517, Examiner Interview Summary mailed Dec. 24, 2009", 3 pgs.

"U.S. Appl. No. 11/512,517, Notice of Allowance mailed Jan. 21, 2010", 8 pgs.

"U.S. Appl. No. 11/512,517, Response filed Dec. 14, 2009 to Non Final Office Action mailed Sep. 16, 2009", 8 pgs.

"U.S. Appl. No. 11/512,520, Notice of Allowance mailed Jan. 25, 2010", 6 pgs.

"U.S. Appl. No. 11/512,608, Non-Final Office Action mailed May 12, 2010", 12 pgs.

"U.S. Appl. No. 11/512,609, Final Office Action mailed Nov. 20, 2009", 15 pgs.

"U.S. Appl. No. 11/512,886, Notice of Allowance mailed Dec. 24, 2009", 8 pgs.

"European Application Serial No. 09012347.2, Extended European Search Report mailed Nov. 26, 2009", 5 pgs.

Krintz, Chandra J., ""Reducing load delay to improve performance of Internet-computing programs"", *University of California, San Diego*, (2001), 225 pgs.

"U.S. Appl. No. 11/512,443, Response filed Oct. 9, 2008 to Non-Final Office Action mailed Jul. 9, 2008", 11 pgs.

"U.S. Appl. No. 11/512,443, Non-Final Office Action mailed Jul. 9, 2008", 17 pgs.

"U.S. Appl. No. 11/512,517, Non-Final Office Action mailed Oct. 29, 2008", 13 pgs.

"U.S. Appl. No. 11/512,519 response filed Nov. 11, 2008 to Non-Final Office Action mailed Sep. 11, 2008", 15 pgs.

"U.S. Appl. No. 11/512,519, Non-Final Office Action mailed Sep. 11, 2008", 14 pgs.

"U.S. Appl. No. 11/512,609, Non Final Office Action mailed on Jun. 19, 2008", 9 pgs.

"U.S. Appl. No. 11/512,609, Response filed Sep. 19, 2008 to Non-Final Office Action mailed Jun. 19, 2008", 8 pgs.

"U.S. Appl. No. 11/512,884, Non-Final Office Action Mailed Jul. 29, 2008", 12 pgs.

"U.S. Appl. No. 11/512,884, Response filed Sep. 23, 2008 to Non-Final Office Action mailed Jul. 29, 2008", 17 pgs.

Liu, et al., "A Knowledge-Based Approach to Requirements Analysis", (1995).

"U.S. Appl. No. 11/511,357, Non-Final Office Action mailed Jul. 2, 2010", 11 pgs.

"U.S. Appl. No. 11/512,440, Non-Final Office Action mailed Jun. 17, 2010", 14 pgs.

"U.S. Appl. No. 11/512,442, Response filed Jun. 21, 2010 to Final Office Action mailed Apr. 21, 2010", 9 pgs.

"U.S. Appl. No. 11/512,457 Notice of Allowance mailed Aug. 13, 2010", 13 pgs.

"U.S. Appl. No. 11/512,457, Response filed Aug. 5, 2010 to Non Final Office Action mailed May 13, 2010", 10 pgs.

"U.S. Appl. No. 11/512,516 Non-Final Office Action mailed Jul. 8, 2010", 20 pgs.

"U.S. Appl. No. 11/512,517, Non-Final Office Action mailed Aug. 16, 2010", 30 pgs.

"U.S. Appl. No. 11/512,518, Non-Final Office Action mailed May 27, 2010", 14 pgs.

"U.S. Appl. No. 11/512,518, Response filed Aug. 24, 2010 to Non Final Office Action mailed May 27, 2010", 10 pgs.

"U.S. Appl. No. 11/512,520 Notice of Allowance mailed Sep. 29, 2010", 6 pgs.

"U.S. Appl. No. 11/512,520, Notice of Allowance mailed Jun. 15, 2010", 6 pgs.

"U.S. Appl. No. 11/512,608 Notice of Allowance mailed Sep. 8, 2010", 8 pgs.

"U.S. Appl. No. 11/512,608, Notice of Allowance mailed Aug. 13, 2010", 9 pgs.

"U.S. Appl. No. 11/512,608, Response filed Aug. 5, 2010 to Non Final Office Action mailed May 12, 2010", 10 pgs.

"U.S. Appl. No. 11/512,443 Notice of Allowance mailed Sep. 21, 2010", 17 pgs.

"U.S. Appl. No. 11/512,457 Notice of Allowance mailed Sep. 17, 2010", 8 pgs.

Bellissard, Luc, et al., "Component-based Programming and Application Management with Olan, Proceedings of Workshop on Distributed Computing", Retrieved on [Jun. 15, 2010] Retrieved from the Internet: URL<http://www.springerlink.com/contenUf2g8rl4083393124/fulitext.pdf>, (1995).

Dotoli, et al., "A decision support system for the supply chain configuration", IEEE, (Oct. 8, 2003), 6 pgs.

Gu, Mingyang, et al., "Component Retrieval Using Conversational Case-Base Reasoning", IEA/AIE, Annecy, France, (Jun. 27-30, 2006), 12 pgs.

Hwang, Jeong Hee, et al., "Context Based Recommendation Service in Ubiquitous Commerce", Database Laboratory, Chungbuk National University, Korea, Springer-Verlag Berlin Heidelberg (2005).

Kahl, Fredrik, et al., "Critical configurations for n-view projective reconstruction", IEEE, (Dec. 14, 2001), 6 pgs.

Park, Young, "Software retrieval by samples using concept analysis", Journal of Systems and Software 54, (2000), 179-183.

Virgilo, "A Rule-based Approach to Content Delivery Adaptation in Web Information Systems", Proc. 7th International Conference on Mobile Data Management, IEEE, (May 12, 2006), 4 pgs.

"U.S. Appl. No. 11/512,440, Notice of Allowance mailed Nov. 12, 2010.", 14 pgs.

"U.S. Appl. No. 11/512,440, Response filed Oct. 18, 2010 to Non Final Office Action mailed Jun. 17, 2010", 11 pgs.

"U.S. Appl. No. 11/512,442, Non Final Office Action mailed Feb. 7, 2011", 14 pgs.

"U.S. Appl. No. 11/512,457, Notice of Allowance mailed Sep. 17, 2010", 7 pgs.

"U.S. Appl. No. 11/512,516, Final Office Action mailed Dec. 22, 2010", 23 pgs.

"U.S. Appl. No. 11/512,516, Response filed Oct. 8, 2010 to Non Final Office Action mailed Jul. 8, 2010", 11 pgs.

"U.S. Appl. No. 11/512,517, Notice of Allowance mailed Feb. 8, 2011", 10 pgs.

"U.S. Appl. No. 11/512,517, Response filed Nov. 16, 2010 to Non Final Office Action maield Aug. 16, 2010", 8 pgs.

"U.S. Appl. No. 11/512,518 Final Office Action mailed Oct. 15, 2010", 15 pgs.

Brown, Wanda Jones, et al., ""Configuration Management Plan for the Science Data Processing System"", Upper Marlboro, Maryland, (Apr. 2001).

Ganguly, et al., "Reducing Complexity of Software Deployment with Delta Configuration", IEEE, (May 21, 2007), 729-732.

Sloane, et al., "Modeling Deployment and Configuration of Cobra Systems with UML", IEEE, (2000), 778.

Ying Li, et al., "Modeling and Verifying Configuration in Service Deployment", IEEE, (2006), 8 pgs.

US 7,571,147, 08/2009, Sattler et al. (withdrawn)

US 7,730,006, 06/2010, Wiesloch et al. (withdrawn)

* cited by examiner

TEST ENGINE

TECHNICAL FIELD

The present subject mater relates to testing software application configurations and, more particularly, to a test engine.

BACKGROUND INFORMATION

Testing computer applications is an important task for many reasons. Typical testing of computer applications may be performed by an organization developing a computer application. This testing has traditionally been performed by users that test various items of functionality according to defined manual testing test cases. Testing of computer applications has evolved into automated testing processes. Test cases may be defined that are then automatically executed to test the various functions of a computer application. However, this is still performed on the applications by the developers.

However, some applications, such as enterprise resource planning ("ERP") applications include vast quantities of functionality. Each instance of such an application may be configured differently and utilize only a subset of the functionality provided. In such instances, when configuration settings are modified by an organization utilizing the application, the configuration may need to be tested. This testing is still being performed in a manual fashion.

Testing such applications following configuration modifications may be a large task depending on the scope of such changes. The testing can be time consuming and the quality of the testing is only as good as the adherence to test cases by one or more individuals.

DETAILED DESCRIPTION

Various embodiments as described and illustrated herein provide systems, methods, and software to automate testing of computer applications. In some embodiments, the testing may be performed by a test engine according to one or more automated test cases. The test engine, in such embodiments, typically evaluates one or more of application configuration settings and scoping information to dynamically identify test cases to execute. In such embodiments, the test engine, when executed, determines what portions of the application to test as a function of one or more of the application configuration settings and the scoping information. Thus, the test cases when executed, may perform testing of the application in a dynamic manner customized to how the application is utilized and configured. These embodiments, and others, are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application are implemented in hardware, software or a combination of software and hardware in one or more embodiments. The software comprises computer executable instructions stored on computer readable media such as memory or other type of storage devices. The term "computer readable media" is also used to represent carrier waves on which the software is transmitted. Further, such functions correspond to modules, which may include one or a combination of software, hardware, or firmware. Multiple functions may be performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
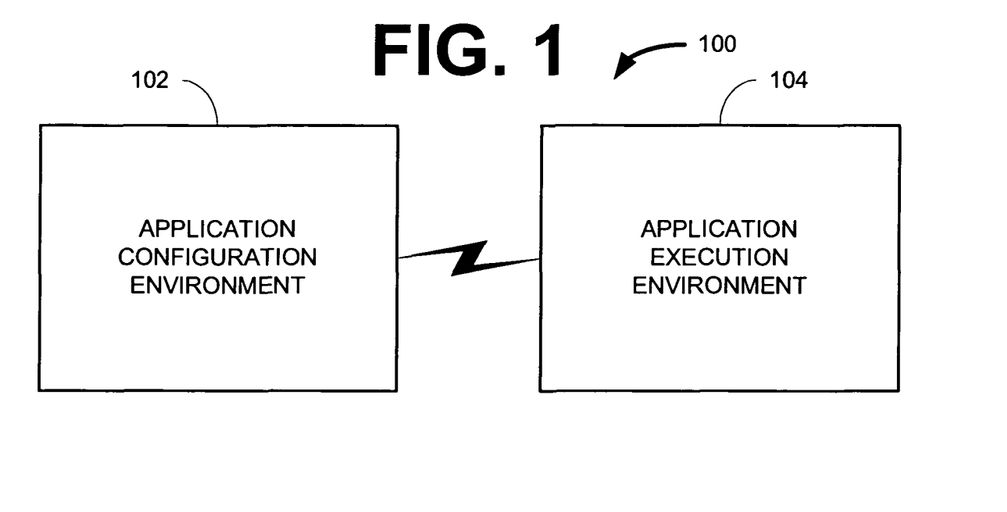
FIG. 1 is a block diagram of a system according to an example embodiment.

FIG. 1 is a block diagram of a system 100 according to an example embodiment. The system 100 includes an application configuration environment 102 and an application execution environment 104.

The application configuration environment 102 is a system 100 environment within which an application can be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration can then be deployed to the application execution environment 104. This deployment can occur to one or more separate instances of the application in the application execution environment 104. Although only a single application execution environment 104 is illustrated, multiple application execution environments 104 can exist, and the deployment can be made to one or more of the multiple application execution environments 104.

Figure 2A:
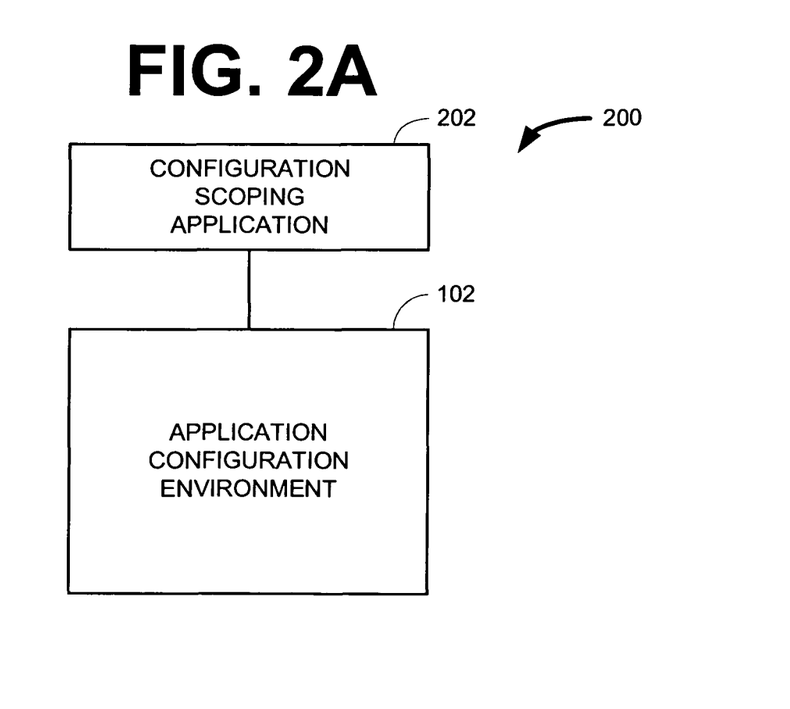
FIG. 2A is a block diagram of a system according to an example embodiment.

FIG. 2A is a block diagram of a system 200 according to an example embodiment. The system 200 includes a configuration scoping application 202 and the application configuration environment 102.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions are linked to one of many adaptation catalog entries. The adaptation catalog entries include a representation of the solution capabilities of an application to be configured, and eventually executed. Because the adaptation catalog entries identify the solution capabilities to be configured and eventually executed, the adaptation catalog entries can further be evaluated to determine what portions of the application to perform testing on to ensure the application is fully functional when deployed. In some embodiments, the solution capabilities are hierarchically divided into areas, packages, topics, and options. There may be multiple areas and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option. These rules can also be evaluated in view of the scoping information to determine what portions of an application to test to ensure that application, when deployed, is properly configured and fully functional.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule may also specify that other packages, topics, and options and the corresponding solution capabilities be excluded.

Thus, when a user answers scoping questions, the configuration of the application is being performed. Further, when a question is answered that is associated with an adaptation catalog entry having a rule that excludes another area, package, topic, or option, that rule may be applied to eliminate questions from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration.

Further, when a rule requires or defaults inclusion of an area, package, topic, or option, that rule may also be utilized by a test engine that executes upon the application when deployed to identify capabilities tied to the required area, package, topic, or option to be tested. Also, when a rule excludes an area, package, topic, or option, the test engine may identify capabilities of the application that do not need to be tested.

Figure 2B:
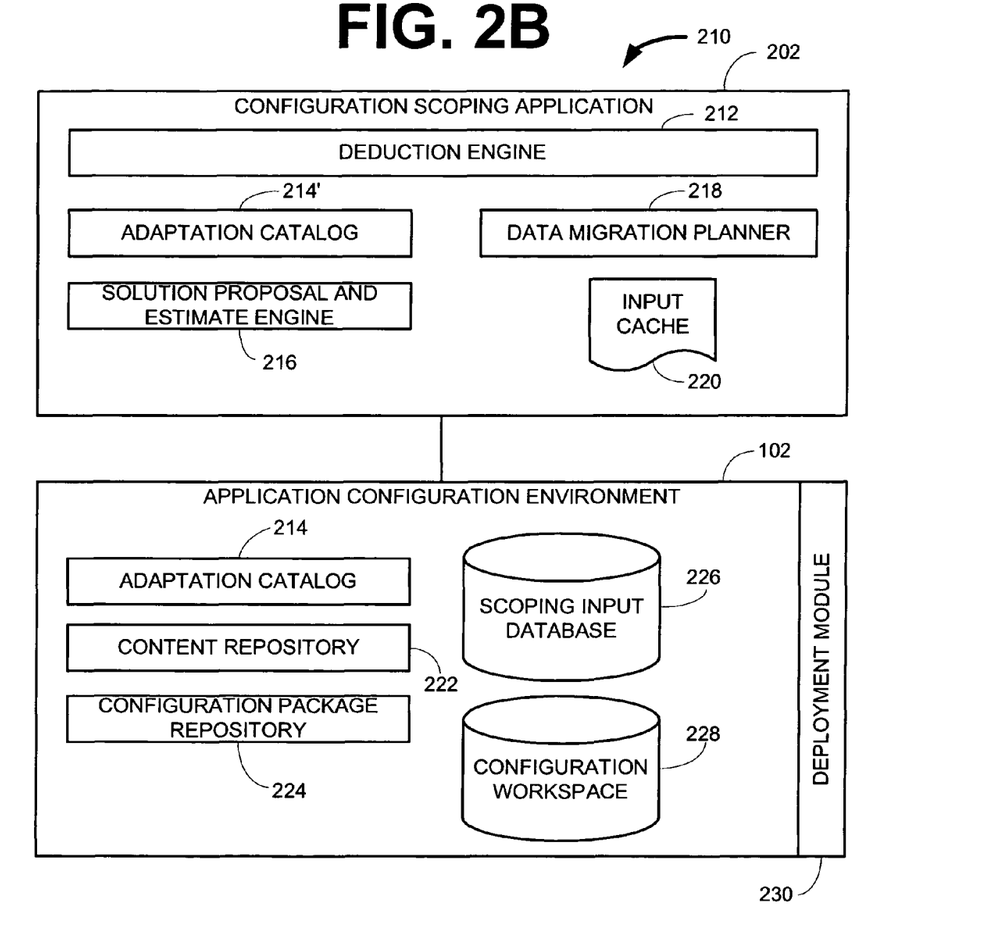
FIG. 2B is a block diagram of a system according to an example embodiment.

FIG. 2B provides further detail of some embodiments of the configuration scoping application 202 in conjunction with an embodiment of the application configuration environment 102.

FIG. 2B is a block diagram of a system 210 according to an example embodiment. The system 210 includes the configuration scoping application 202 and the application configuration environment 102.

The configuration scoping application 202, in some embodiments, includes a deduction engine 212, and an adaptation catalog 214'. In this embodiment, the configuration scoping application 202 further typically includes a solution proposal and estimate engine 216, a data migration planner 218, and an input cache 220.

The application configuration environment 102, in some embodiments, includes an adaptation catalog 214, a content repository 222, and a configuration package repository 224. In some such embodiments, the application configuration environment further includes a scoping input database 226, a configuration workspace 118, and a deployment module 230.

The adaptation catalog 214 may include a representation of the solution capabilities of an application to be configured, and eventually executed. Each capability of an application to be configured is identified in an adaptation catalog 214 entry. The adaptation catalog 214 entries each may be identified as an area, package, topic, or option and may be organized in a hierarchy with a child identifying the parent. An example hierarchy is a "General Ledger" capability, which in some embodiments typically is a package having two topics, "cash based" and "accrual based" which may be two application capabilities within the "General Ledger" capability.

The adaptation catalog 214 entries may further include scoping questions directed toward obtaining scoping information to determine what areas, packages, topics, and options are relevant to the user's needs. Additionally, the adaptation catalog entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application when deployed.

In some embodiments, rules and entries in the adaptation catalog can be linked to a configuration package that exists in the configuration package repository 224 within the application configuration environment 102. A configuration package includes one or more configuration settings that enable or disable functionality of the application when deployed.

In some embodiments, adaptation catalog entries and configuration packages may further be linked to one or more test cases stored in the content repository. Some such test cases include test cases that may be executed by a test engine in an application execution environment to test the capabilities of the application associated with the respective adaptation catalog entry or configuration package.

In one embodiment, the rules of adaptation catalog entries may be applied by the deduction engine 212 of the configuration scoping application 202. The configuration scoping application 202 typically presents a user interface that requests answers to questions that may be identified by the deduction engine 212 based on the adaptation catalog 214'. The adaptation catalog 214' typically is a copy of the adaptation catalog 214 of the application configuration environment 102. When an answer is received by the configuration scoping application 202 through the user interface, the answer may be stored in the input cache 220 of the configuration scoping application 202. The deduction engine 212 then typically applies the rule associated with the adaptation catalog 214' entry of the question asked to the received answer. Through the application of the rule, in view of answers already received and rules already applied, the deduction engine 212 may be configured to identify a next question to ask. The identified question typically is then presented to the user through the user interface. This process may be configured to continue until either all of the questions have been asked, the user is out of time, or the user otherwise chooses to stop. If questions remain that have not been answered, the process typically can be continued at a later time or rules may be configured to specify default areas, packages, topics, and options in order to supply enough information to allow deployment of the application in a functional form.

In some embodiments, the configuration scoping application 218 further includes a data migration planner 218. In such embodiments, one or more additional scoping questions typically can be asked. These additional scoping questions may be directed toward obtaining information from the user about legacy systems and how data is stored within them. In some embodiments, the questions simply ask what systems are currently in use. In other embodiments, the questions are more detailed to obtain information such as what type of database is a system utilizing and what type of customization has been made or custom systems developed. The data migration planner 218 typically uses the answers to these additional questions to propose a data migration plan to the new application.

In some embodiments, the configuration scoping application 202 includes a solution proposal and estimate engine 216. The solution proposal and estimate engine 216 may be used in a sales situation. For example, if a sales person is discussing with a sales lead what a certain application product can do for the sales lead, the sales person typically can utilize the configuration scoping application 202 to obtain information about the needs of the sales lead via the scoping questions. The scoping question answers may then be utilized by the solution proposal and estimate engine 216 to make an initial determination of what will be involved if the sales lead decides to purchase the application. The solution proposal and estimate engine 216 normally is configured to output information for the sales person to make several determinations, such as the size of effort necessary to implement or transition to the application from legacy system, the cost involved, and cost. In some embodiments, the output of the solution proposal and estimate engine 216 outputs one or more of an implementation cost estimate, an application solution proposal, and a recommended project roadmap. In some embodiments, the solution proposal and estimate engine 216 outputs a proposal for one or more other options, application descriptions, sales literature, benefit statements of using the application, and addition documents, such as a proposal of key performance indicators the application can monitor to assist in managing the application or enterprise of the sales lead.

After the scoping question have been answered, the answers, and any other information obtained from a sales lead or other user of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application environment 102, the scoping question answers are typically stored to the scoping input database 226. The scoping question answers, in some instances, will be referred to interchangeably as the "scoping information."

After the scoping information is within the scoping input database 226, a typical process within the application configuration environment 102 can execute to begin configuring an application in the configuration workspace 228. The configuration workspace may include a set of configuration tables that mirror, at least in part, the configuration tables of the application.

The process that configures the application typically determines one or more configuration packages to instantiate in the configuration workspace 228. Configuration packages, in some embodiments, include one or a set of configuration settings to enable or disable certain capabilities of the application. Configuration packages, as mentioned above, can be linked to adaptation catalog 214 entries and rules associated with adaptation catalog entries. Thus, the process that configures the application in the configuration workspace 228 typically queries the scoping information in the scoping input database 226 to identify configuration packages to instantiate.

In some embodiments, as the configuration process configures the application, the configuration process may further identify test cases to include with the application configuration. Identified test cases, or a representation thereof, may be stored by the configuration process into the configuration workspace 228. The test cases may be identified when the configuration process determines configuration packages to instantiate in the configuration workspace 228. In some such embodiments, one or more test cases may be linked to one or a combination of configuration packages.

In some embodiments, demonstration data exists to facilitate the instantiation of a demonstration instance of the application for a sales lead, training session, or other purpose. The demonstration data, in some embodiments, is linked to one or more configuration packages from the configuration package repository 224. The demonstration data typically exists in the content repository 222 so that it can be copied into a set of application tables in the configuration workspace 228. These tables may hold such data transactional data, operational data, master data, or other data that can exist in the application when the application is ready for execution or is executed.

Once the demonstration data is copied to the configuration workspace 228, that data may be fine-tuned to more closely match the intended use of the demonstration data. For example, the system may be configured to that a sales person, or other individual, can fine-tune demonstration data values to more closely match a sales lead's expectations of the application. Such fine tuning may include modifying sales order documents in the demonstration data to include a name, address, and logo of the sales lead's enterprise, or other similar modifications to the demonstration data.

After the application has been configured in the configuration workspace and the demonstration data, if any, is ready, the configuration typically is deployed by the deployment module 230. The deployment module 230 may be configured to deploy configuration settings and test cases to a baseline application that has already been instantiated in an application execution environment. In some embodiments, the deployment module includes a configuration setting deployment process, an activation process, and a data deployment process. The configuration setting deployment process typically copies configuration settings from configuration tables in the configuration workspace 228. The configuration setting deployment process may further be configured to deploy test cases to the application execution environment. The data deployment process may be configured to execute if there is demonstration data in the configuration workspace 228. If there is demonstration data, the data typically is copied from the configuration workspace 228 to application tables in the application execution environment. Some embodiments further utilize the activation process.

The activation process, in some of such embodiments, executes to activate the application in the application execution environment after it has been successfully deployed. In some instances, the activation process requires an activation key, message, code, or other authorization from an activation authority to activate the application. The activation authority may be configured to include one or more of a number of individuals or entities. An example of an activation authority is an entity selling the application to be activated. This activation functionality requiring an activation key or other mechanism can be utilized for several purposes. Some of such purposes typically include allowing the entity selling the application to ensure the application is properly configured, has passed certain testing necessary for the entity to ensure it will meet guaranteed service level agreements or objectives, for billing purposes, or other purposes that can benefit from such an activation process. In some embodiments, the activation process may ensure that test cases deployed to the application execution environment have been successfully executed.

In some embodiments, the deployment module 230 further includes a delta deployment process that is relevant only after an application has already been deployed. When an application is deployed, or subsequently modified, the scoping information in the scoping input database 226 typically is updated. In some embodiments, enables tracking of a current configuration of a deployed application. In embodiments including the delta deployment process, the scoping information typically is further tracked on a historical basis to at least allow a view of a current configuration and a modified configuration not yet deployed, if applicable. The delta deployment process then typically uses that historical tracking of the application configuration to identify changes between the current application configuration and the modified configuration not yet deployed. The delta deployment process then normally only deploys the changes to the application configuration.

Figure 3:
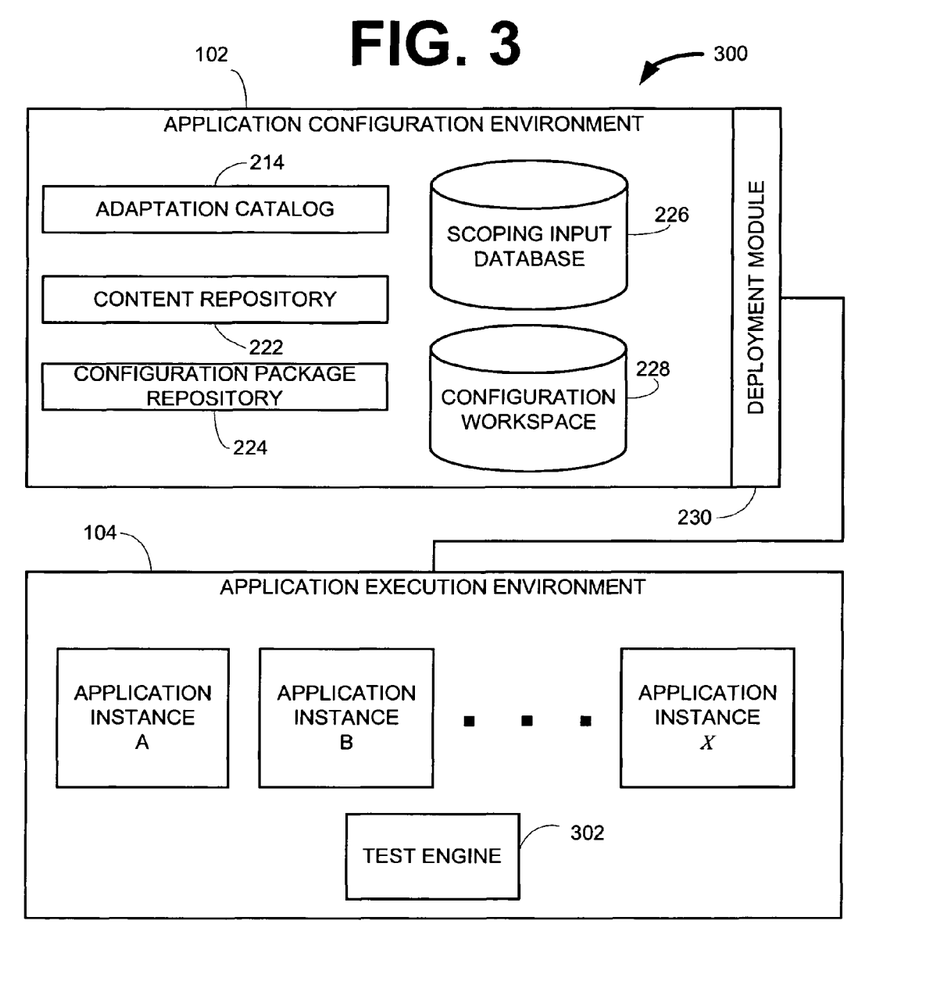
FIG. 3 is a block diagram of a system according to an example embodiment.

FIG. 3 is a block diagram of a system 300 according to an example embodiment. The system 300 includes the application configuration environment 102 as discussed above with regard to FIG. 1, FIG. 2A, and FIG. 2B. The system 300 further includes an application execution environment 104.

The application execution environment 104 is a data processing environment within which an application, or an application to be deployed, can execute. When deploying an application, the deployment module 230 needs to know what application execution environment 104 and what application instance within that environment to deploy to. In embodiments including only one application execution environment 104, the application execution environment 104 may already be known. Similarly, in an application execution environment including only a single application instance, the instance may already be known.

Each instance of the application (i.e., application instances A, B, . . . X) typically includes a set of identical configuration tables which can include distinct configuration settings from one another. In some embodiments, multiple instances of the application exist to provide a development instance, a test instance, and a production instance. In such embodiments where there are multiple application instances, the deployment module 230 may be configured to deploy the configuration settings from one of the application instances in the application execution environment 104 to another application in the same or another application execution environment 104. Although the deployment module 230 is illustrated as being a part of the application configuration environment 102, the deployment module 230, in other embodiments, can be a standalone application or a part of another application or process.

In some embodiments, the application execution environment 104 includes a test engine 302. The test engine 302 is a process that causes one or more test cases to execute within one or more application instances. Although the test engine 302 is illustrated as a process outside of the application instances, in some embodiments, each application instance may include a test engine 302 process. In some other embodiments, the test engine 302 executes on a testing server that is operatively coupled to the application execution environment 104 to allow the test engine 302 to test an application instance.

The test engine 302 typically includes one or more process that test an application instance according to one or more test cases. In some embodiments, the test engine 302 queries one or more of the scoping information and configuration settings of an application instance under test to identify test cases to execute. In some embodiments, the test engine may query one or more of the scoping information and the configuration settings from the application configuration environment. In some embodiments, the test engine 302 may query one or more of the scoping information and the configuration settings from a local copy stored with the application instance in the application execution environment 104.

In some embodiments, the deployment module 230 may deploy test cases to the application execution environment 104. In some such embodiments, the test cases may be deployed to one or more of an application instance or another storage location within the application execution environment. In some such embodiments, the test cases may be deployed to the test engine 302. In other embodiments, the test engine 302 may include test cases that may be dynamically selected for execution while the test engine 302 test an application instance.

Thus, as the test engine 302 dynamically selects test cases for execution as a function of one or more rules associated with adaptation catalog entry rules, configuration package rules, the scoping information, configuration settings, and other data, the granularity of the selected test cases typically equals the granularity of possible application configuration settings.

The test engine 302 is typically activated by a user or the activation process of the deployment module 230. After the test engine 302 is activated, the test engine 302 typically executes until a series of test cases have been executed to test a portion of the application instance under test or the entire application instance under test. In some embodiments, when activated, the test engine 302 identifies test cases to execute as a function of one or more of the scoping information, the application instance configuration settings, and rules associated with adaptation catalog entries and configuration packages. For example, a rule associated with a configuration package may specify that if the configuration package is deployed to the application instance, execute a specific configuration package to test the application capabilities and functionality associated with the configuration package. After a test case is executed, the test engine 302 may identify a next test case to execute. Thus, in some embodiments, once the test engine 302 is activated, the test engine 302 may dynamically identify test cases to execute and will continue executing until all test cases identified to execute have been executed.

In some embodiments, the application instance under test may include objects that provide services that may be called via one or more object methods. In some such embodiments, one or more test cases may exist to test one or more services of an object by calling the object methods.

In some embodiments, one or more test cases may require data to test the application under test. In some such embodiments, one or more test cases may be configured to include data generation scripts to generate the data.

In some embodiments, data created or modified by a test case may be input data for another test case. In some such embodiments, a test case includes a rule that identifies a next test case to execute as a function of data output by a previously executed test case.

In some embodiments, the test engine 302 may cause a test case to be executed multiple times. In some such embodiments, a test case may be executed multiple times when a portion of the application under test may execute differently based on a factor. In some embodiments, the factor may be dependent on data, a portion of the application under test from which the test case is being executed, or any other of a number of factors that may cause a portion of the application under test to behave differently.

In some embodiments, if an error, or other exception occurs while the test engine 302 is executing, the error or other exception is trapped, logged, and another test case is then executed. The logging of the error or other exception may be made to allow later viewing of the error or other exception. A user may then view the log to determine if any changes are needed to the application instance that was tested.

In some embodiments, after the test engine 302 has executed, a code, or other identifier may be generated. This code or other identifier may be provided to the activation process. This code or other identifier may also, or alternatively, be supplied to an activation authority. In these embodiments, the code or other identifier may be required prior to activation of the application instance.

Figure 4:
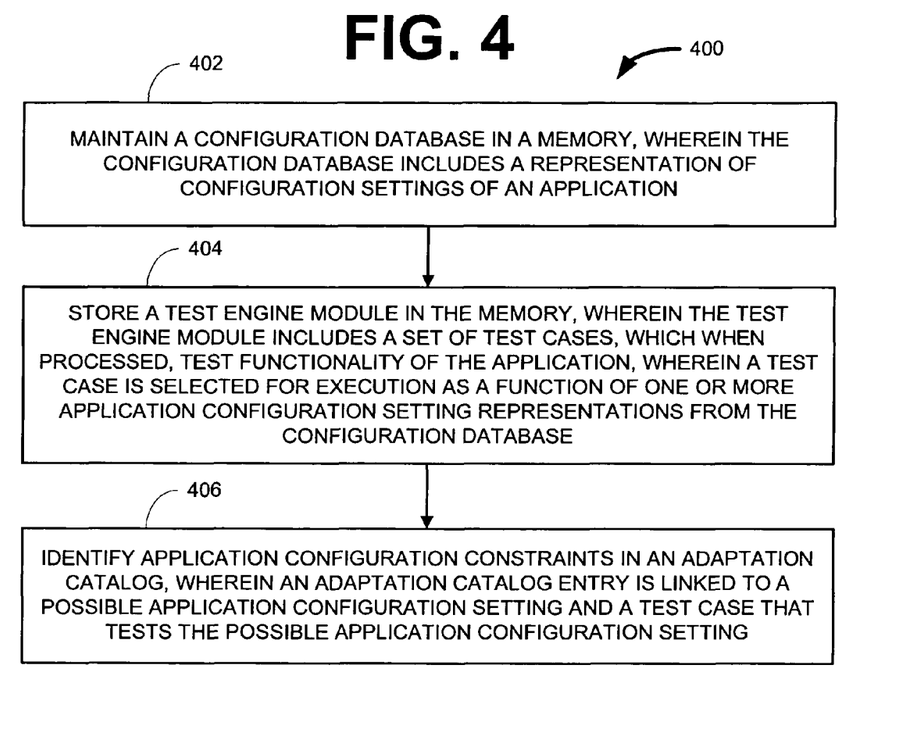
FIG. 4 is a flow diagram of a method according to an example embodiment.

FIG. 4 is a flow diagram of a method 400 according to an example embodiment. The method 400 includes maintaining a configuration database in a memory, wherein the configuration database may include a representation of configuration settings of an application 402. The method 400 further includes storing a test engine module in the memory, wherein the test engine module may include a set of test cases, which when processed, test functionality of the application, wherein a test case is selected for execution as a function of one or more application configuration setting representations from the configuration database 404.

In some embodiments, one or more test cases may be configured to include a data generation script, which when processed, generates data within the application upon which the one or more test cases rely to test application functionality. In some test case embodiments, an output of a selected test case may be the input for one or more test cases that can be subsequently selected by the test engine for execution.

Figure 5:
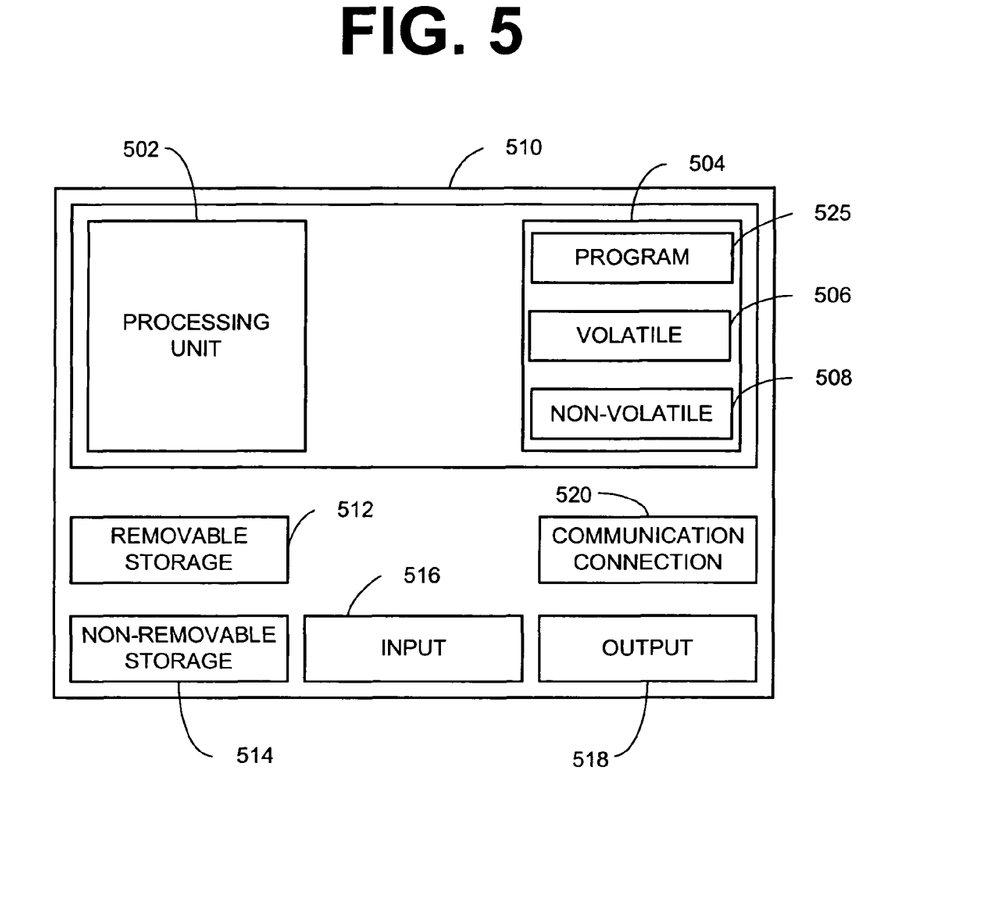
FIG. 5 is a block diagram of a system according to an example embodiment.

FIG. 5 is a block diagram of a computing system according to an example embodiment. In one embodiment, multiple such computer systems are utilized in a distributed network to implement multiple components in a transaction-based environment. An object-oriented architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage typically includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. The term "computer readable medium" is also used to represent carrier waves on which the software is transmitted. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A system comprising:
a memory;
an application stored in the memory and executable within the system;
a configuration database stored in the memory, wherein the configuration database includes a representation of application configuration settings of the application as configured;
a test engine, wherein the test engine includes a set of test cases to test functionality of the configured application stored in the memory, wherein a test case is selected for execution as a function of at least one application configuration setting representation of the application as configured in the configuration database; and
an adaptation catalog including representations of application solution capabilities and identifying application configuration constraints, wherein an adaptation catalog entry is linked to a possible application configuration setting and a test case that tests the possible application configuration setting.

2. The system of claim 1, wherein at least one test case includes a data generation script to generate data within the application upon which the at least one test case relies to test application functionality.

3. The system of claim 1, wherein the output of a selected test case is the input for at least one test case that can be subsequently selected by the test engine for execution.

4. The system of claim 1, wherein a granularity of the test cases is equal to a granularity of possible application configuration settings.

5. The system of claim 1, wherein the test engine selects a second test case for execution following execution of a first test case.

6. The system of claim 1, wherein after execution of the test engine is started, test engine execution is automatic.

7. A method comprising:
maintaining a configuration database in a memory, wherein the configuration database includes a representation of configuration settings of an application as deployed;
storing a test engine module in the memory, wherein the test engine module includes a set of test cases, which when processed, test functionality of the application as deployed, wherein a test case is selected for execution as a function of at least one application configuration setting representation from the configuration database; and
identifying application configuration constraints in an adaptation catalog, the adaptation catalog including representations of application solution capabilities, wherein an adaptation catalog entry is linked to a possible application configuration setting and a test case that tests the possible application configuration setting.

8. The method of claim 7, wherein at least one test case includes a data generation script, which when processed, generate data within the application upon which the at least one test case relies to test application functionality.

9. The method of claim 7, wherein the output of a selected test case is the input for at least one test case that can be subsequently selected by the test engine for execution.

10. The method of claim 7, wherein a granularity of the test cases is equal to a granularity of possible application configuration settings.

11. The method of claim 7, wherein the test engine module, when processing, selects a second test case for execution following execution of a first test case.

12. The method of claim 7, wherein after execution of the test engine module is started, test engine module execution is automatic.

13. A non-transitory machine-readable medium, with encoded instructions stored thereon, which when executed, cause a machine to:
maintain a configuration database in a memory, wherein the configuration database includes a representation of configuration settings of an application as deployed;
store a test engine module in the memory, wherein the test engine module includes a set of test cases, which when processed, test functionality of the application as deployed, wherein a test case is selected for execution as a function of at least one application configuration setting representation from the configuration database; and
identify application configuration constraints in an adaptation catalog, the adaptation catalog including representations of application solution capabilities, wherein an adaptation catalog entry is linked to a possible application configuration setting and a test case that tests the possible application configuration setting.

14. The non-transitory machine-readable medium of claim 13, wherein at least one test case includes a data generation script, which when processed, generate data within the application upon which the at least one test case relies to test application functionality.

15. The non-transitory machine-readable medium of claim 13, wherein the output of a selected test case is the input for at least one test case that can be subsequently selected by the test engine for execution.

16. The non-transitory machine-readable medium of claim 13, wherein a granularity of the test cases is equal to a granularity of possible application configuration settings.

17. The non-transitory machine-readable medium of claim 13, wherein the test engine module, when processing, selects a second test case for execution following execution of a first test case.

* * * * *